United States Patent
Tetenes

(10) Patent No.: US 9,713,317 B1
(45) Date of Patent: Jul. 25, 2017

(54) DEVICE FOR GRABBING EELS AND OTHER CREATURES

(71) Applicant: John L. Tetenes, Massapequa, NY (US)

(72) Inventor: John L. Tetenes, Massapequa, NY (US)

( * ) Notice: Subject to any disclaimer, the term of this patent is extended or adjusted under 35 U.S.C. 154(b) by 117 days.

(21) Appl. No.: 14/524,063

(22) Filed: Oct. 27, 2014

(51) Int. Cl.
*A01K 97/00* (2006.01)
*A01K 29/00* (2006.01)

(52) U.S. Cl.
CPC .............. *A01K 29/00* (2013.01); *A01K 97/00* (2013.01)

(58) Field of Classification Search
CPC B25B 7/02; B25B 13/08; B25B 13/28; B25B 27/205; B05B 13/58
USPC .................................................. 43/4, 5, 53.5
See application file for complete search history.

(56) References Cited

U.S. PATENT DOCUMENTS

| | | | |
|---|---|---|---|
| 2,091,893 A | 8/1937 | Tillinghast | |
| RE21,375 E | 2/1940 | Tillinghast | |
| 2,547,592 A | 4/1951 | Morris | |
| 2,634,159 A * | 4/1953 | Agneberg | A01K 97/18 294/118 |
| 2,643,151 A * | 6/1953 | Zupancic | A01K 97/00 24/498 |
| 2,656,746 A * | 10/1953 | Glass, Jr. | A01K 95/02 29/243.57 |
| 2,670,557 A * | 3/1954 | Pachner | A01K 97/05 209/418 |
| 2,671,979 A | 3/1954 | Jones, Jr. | |
| 2,972,831 A | 2/1961 | Anselmi | |
| 2,990,863 A * | 7/1961 | Pantermoller | A47J 43/14 30/135 |
| 3,287,845 A | 11/1966 | Smith | |
| D223,574 S * | 5/1972 | Pittis | 43/53.5 |
| 3,738,050 A | 6/1973 | Naill | |
| 5,588,689 A * | 12/1996 | Ochs | A61C 19/02 294/118 |
| 5,815,873 A * | 10/1998 | Jones | A46B 15/0055 15/106 |
| 5,902,015 A * | 5/1999 | Allcock | B25B 7/123 297/250.1 |
| 6,571,505 B1 * | 6/2003 | Poiencot, Jr. | A01K 97/14 119/806 |

(Continued)

OTHER PUBLICATIONS

Website URL: http://www.eelwrangler.com; 7 Pages, Jan. 25, 2014; author—John L. Tetenes.

(Continued)

*Primary Examiner* — Shin Kim
(74) *Attorney, Agent, or Firm* — Richard L. Miller

(57) ABSTRACT

A locking device that is held in a hand of a user, grabs an eel directly at any desired position along the eel, impales the eel and locks onto the eel of any diameter both for secure grabbing. The locking device includes a stationary handle, a movable handle, a stationary jaw, and a movable jaw. The stationary handle and the movable handle are pivotally attached to each other, and are held in the hand of the user. The stationary jaw and the movable jaw are pivotally attached to each other, extend from the stationary handle and the movable handle, respectively, grab the eel directly at any desired position along the eel, and impale the eel and lock onto the eel of any diameter both for secure grabbing.

48 Claims, 6 Drawing Sheets

(56) References Cited

U.S. PATENT DOCUMENTS

| | | | | |
|---|---|---|---|---|
| 6,745,441 B1* | 6/2004 | Lin | ............................ | B25B 5/06 100/234 |
| 6,839,949 B1* | 1/2005 | Miknich | ................ | A44B 19/00 29/33.2 |
| 6,880,794 B1* | 4/2005 | Kahn | ........................ | A45F 5/02 24/115 R |
| 6,968,644 B1* | 11/2005 | Garcia | .................... | A01K 97/18 294/118 |
| 6,983,559 B1* | 1/2006 | Kraus | .................... | A01K 97/18 43/4 |
| 7,055,414 B2* | 6/2006 | Konen | ...................... | B25B 7/00 267/166 |
| 7,114,208 B1* | 10/2006 | Borst | ........................ | B25B 7/02 7/107 |
| 7,134,366 B2* | 11/2006 | Schuh | ...................... | B25B 7/22 81/419 |
| D591,115 S * | 4/2009 | Repac | ............................ | D7/686 |
| 7,644,532 B2* | 1/2010 | Capio | .................. | A01K 63/006 43/11 |
| 7,814,701 B1* | 10/2010 | Sanchez, Sr. | .......... | A01K 97/14 43/4 |
| 7,909,375 B2* | 3/2011 | Waldman | ................ | A47G 21/10 294/16 |
| 7,997,170 B1* | 8/2011 | Martinez | .................. | B25B 7/00 7/128 |
| 2002/0083800 A1* | 7/2002 | Bennett | .................. | B25B 13/50 81/176.2 |
| 2003/0061917 A1* | 4/2003 | Malvini | .................... | B25B 7/00 81/300 |
| 2004/0107549 A1* | 6/2004 | Lin | ............................ | B25B 5/06 24/505 |
| 2004/0163495 A1* | 8/2004 | Konen | ...................... | B25B 7/00 81/9.4 |
| 2005/0097996 A1* | 5/2005 | Malvini | .................. | A45C 13/20 81/300 |
| 2010/0319236 A1 | 12/2010 | Stebbing | | |
| 2012/0145755 A1* | 6/2012 | Kahn | ...................... | A45F 5/021 224/183 |
| 2012/0167728 A1* | 7/2012 | Miramontes | ....... | A62B 35/0068 81/324 |
| 2014/0230615 A1* | 8/2014 | Gregory | .................. | B25B 7/126 81/301 |
| 2014/0338133 A1* | 11/2014 | Gonzalez | ................ | B25F 1/003 7/128 |
| 2014/0346821 A1* | 11/2014 | Flis | ........................ | A45F 5/021 297/188.04 |
| 2015/0101128 A1* | 4/2015 | Warner | ................... | F41B 5/148 7/125 |

OTHER PUBLICATIONS

Transcription of YouTube video: Fishing for stripe bass? Try Eel Wrangler & Eel Keeper, URL: https://www.youtube.com/watch?v=yYuFPpndyZc; Jan. 25, 2014; author—John L. Tetenes.

16 Screenshots approximately 5 seconds apart for: YouTube video: Fishing for stripe bass? Try Eel Wrangler & Eel Keeper, URL https://www.youtube.com/watch?v=yYuFPpndyZc ; Jan. 25, 2014 author—John L. Tetenes.

* cited by examiner

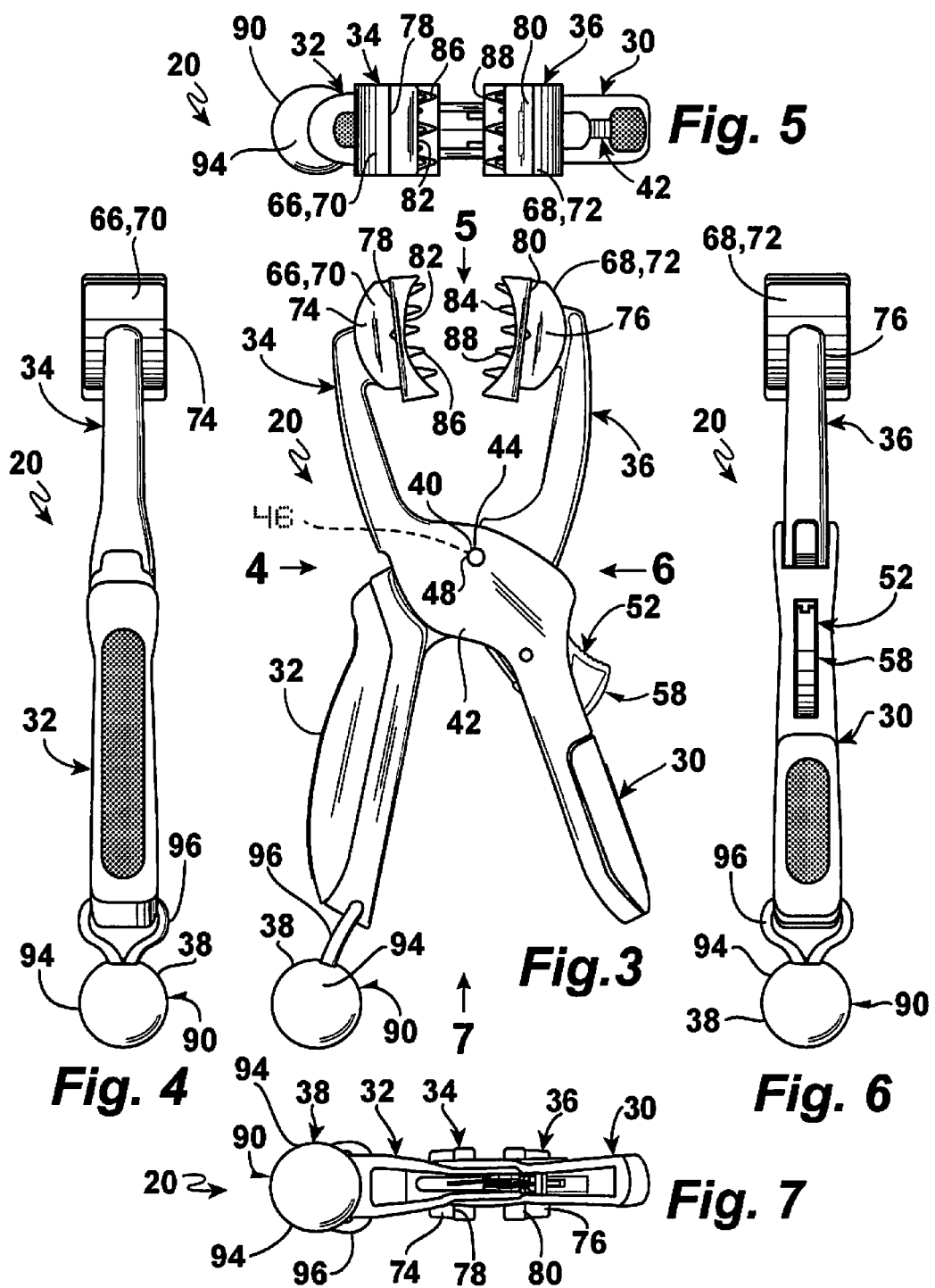

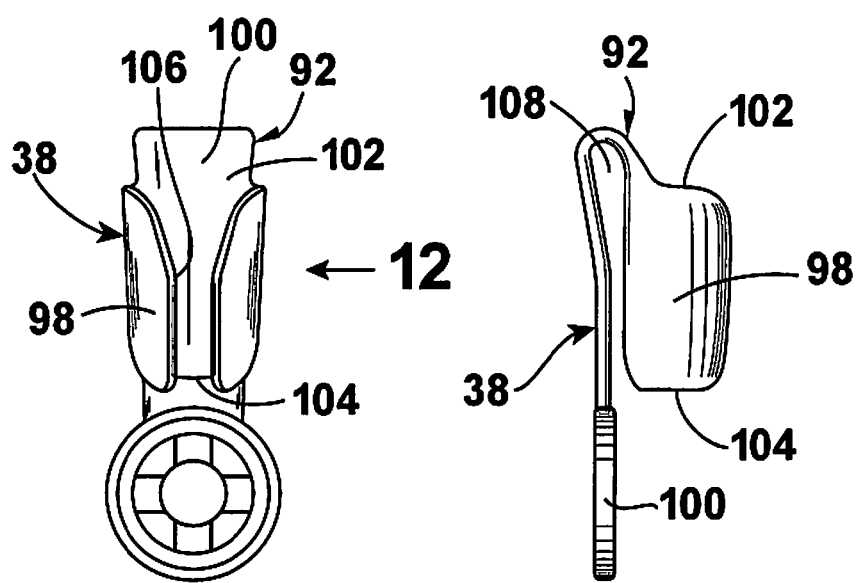

DEVICE FOR GRABBING EELS AND OTHER CREATURES

BACKGROUND OF THE INVENTION

Field of the Invention

The present invention relates to a grabbing device, and more particularly, a device for grabbing eels and other creatures.

Description of the Prior Art

Numerous innovations for sea creature handling devices have been provided in the prior art that will be described. Even though these innovations may be suitable for the specific individual purposes to which they address, however, they differ from the present invention.

A FIRST EXAMPLE, U.S. Pat. No. RE 21,375, Issued on Feb. 27, 1940, to Tillinghast teaches a device including a tube having a longitudinal slot therein, pivoted members are disposed at one end of the tube, and an upright guard member is adjacent the pivotal members.

A SECOND EXAMPLE, U.S. Pat. No. 2,091,893, Issued on Aug. 31, 1937, to Tillinghast teaches a device including a tube having a longitudinal slot therein, pivoted members are disposed at one end of the tube, and an upright guard member is adjacent the pivotal members.

A THIRD EXAMPLE, U.S. Pat. No. 2,547,592, Issued on Apr. 3, 1951, to Morris teaches a device for dislodging fish hooks from eels, which includes a tube having a longitudinal slot for reception of a fish line, and a resilient member fixed at one end to the exterior of the tube, and has an extension at the opposite end disposed at substantially right angles to the longitudinal axis of the tube. The tube has a lateral opening in the path of movement of the extension for passage of the extension through the opening and into the tube. The end of the extension has an eel-engaging apparatus to press an eel against the wall of the tube, opposite the opening. A plane includes the longitudinal axis of a portion of the resilient member that is fixed to the tube, and the longitudinal axis of the extension is parallel to the longitudinal axis of the slot.

A FOURTH EXAMPLE, U.S. Pat. No. 2,634,159, Issued on Apr. 7, 1953, to Agneberg teaches a fish grabber including a pair of cross pivoted handles, bowed jawa carried by the outer ends of the handles, and a pair of coacting plates fixedly mounted on the jaw. The handles have loops, both of which are adapted to receive the fingers and the thumb, respectively, of a hand. The jaws lie substantially in the same plane with the loops of the handles, and are so bowed that when the handles are closed, an oval-shaped opening is formed between the jaws, which is substantially symmetrical about a plane passed normal to, and midway between, the loops of the handles. One of the plates is right handed and the other is left handed corresponding in size, shape, and relative position of parts that are on opposite sides of the plane. The plates conform substantially to the shape of the jaws on the lines of mounting but with a taper toward respective ends, and have substantially symmetrical transverse curvature on each side of their rectilinear lengthwise axes. Each of the plates has, respectively, a recess at one end adapted to engage gills of large fish positioned longitudinally of the plates, recesses in respective sides thereof are adapted to engage gills of smaller fish positioned transversely of the plates. All of the recesses have such varyingly curved contour that a range of sizes of fish may be accommodated in each. The plates are mounted on the jaws so that the length is divided with a substantially lesser distance to the end with the recess. The recessed end and the sides of the plates have sharply curved hook shaped edges, whereby the clamping action of the grabber is aided by a gripping of the edges on the surface of the fish.

A FIFTH EXAMPLE, U.S. Pat. No. 2,671,979, Issued on Mar. 16, 1954, to Jones, Jr. teaches a unitary eel holder devoid of moving parts and adapted to restrain the movements of a hooked eel confined therein so as to permit decapitation of the eel at a point at the rear of the hook. The holder includes a tubular body portion having a longitudinal slot therethrough to permit passage of a fishing line, a front plate adapted to limit the forward movement of the ell, and has a line-receiving slot intersecting the longitudinal slot. The body has a transverse knife-receiving slot intersecting the longitudinal slot at a point spaced rearwardly from the front plate to permit decapitation of the eel while its nose portion is held against the front plate, and a decapitation block within the forward end of the tubular body portion. The block has an inclined rear portion providing a guide for the head of the eel, and a raised front portion has a transverse slot therein.

A SIXTH EXAMPLE, U.S. Pat. No. 2,972,831, Issued on Feb. 28, 1961, to Anselmi teaches a live bait holder including apparatus for attaching a line thereto, a shank, at least one side hook attached to each side of the shank and extending downwardly from the shank at an angle less than 90° and biasing out from the shank at an angle less than 90°, apparatus to force the side hooks toward one another, apparatus to retain the side hooks so forced in a substantially fixed position, and a harnessing apparatus fixed to the downward side of the shank and extending substantially parallel thereto so that the harnessing apparatus extends between the side hooks.

A SEVENTH EXAMPLE, U.S. Pat. No. 3,287,845, Issued on Nov. 29, 1966, to Smith teaches an eel-impaling device including an elongated barrel formed of sheet metal having a generally U-shaped cross-sectional configuration and having at the front end thereof a transverse guide plate with an opening centrally disposed therein, and a spear positioned in the barrel with the forward end thereof slidably mounted in the opening for guided longitudinal movement between a retracted position at least substantially entirely within the barrel to an extended position wherein the forward end of the spear projects beyond the front end of the barrel. The forward end of the spear is provided with a point. Further included is a handle member secured below the barrel adjacent the rear end thereof. The handle member is formed of sheet metal of generally U-shaped configuration, open at the front end thereof. Further included is a pivot pin that is mounted transversely between the opposite sides of the handle member in the upper portion thereof, and a lever that is pivotally mounted intermediate its ends on the pivot pin and has its upper end pivotally connected to the rear end of the spear. The lower end of the lever extends below the pivot pin to provide a gripping portion movable between an open position diverging outwardly from within the handle and a closed position at least partially nested within the handle to thereby actuate the spear between its retracted and extended positions, respectively. Further included is a spring apparatus disposed between the handle and the gripping position for urging the gripping portion into an open position, and a bracket member fixed on one side of the barrel and having a generally annular portion extending forwardly therefrom to define with the front end of the barrel a substantially circular vertical and open area adapted to receive an eel head. The bracket has a free end terminating in closely spaced relation from the opposite side of the barrel to provide a narrow gap through which a fishing line may be introduced for drawing an eel into the open area and having a bearing surface positioned in longitudinal alignment with the barrel and in opposite spaced relation with respect to the front end thereof, whereby an eel may be held in position during the impaling action of the spear and gripped thereby while removing the hook.

AN EIGHTH EXAMPLE, U.S. Pat. No. 3,738,050, Issued on Jun. 12, 1973, to Naill teaches an eel holder that includes an elongate and hollow tube having a flared inlet end and a longitudinal slot extending from end-to-end of the tube. The tube is supported on a base, and has a transverse slot opening downwardly therein, at the end thereof opposite the inlet end. A clamp member is pivotally secured to the tube, and has a jaw member that engages through the transverse slot to clamp an eel immediately back of the head to immobilize the eel while removing the hook. A bar is secured to the tube, and extends upwardly therefrom. A plurality of bores are formed in the bar to receive a securing pin extending through the clamp so as to adjustably secure the clamp in a clamping position to permit both hands to be used in extracting the hook from the mouth of the eel.

A NINTH EXAMPLE, U.S. Patent Office Document No. 2010/0319236, Published on Dec. 23, 2010, to Stebbing teaches a fish grabbing device that automatically grabs a fish when the fish explores, strikes, or attempts to eat the bait. The grabber may include a coiled body having pointed ends that are held together by detents. When the fish explores the grabber and accompanying bait, the fish trips a trigger, which causes the movement of grabber ends so that they expand within the fish's mouth, thereby catching the fish.

It is apparent now that numerous innovations for sea creature handling devices have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a device for grabbing eels and other creatures that avoids the disadvantages of the prior art.

ANOTHER OBJECT of the present invention is to provide a device for grabbing eels and other creatures that is simple and inexpensive to manufacture.

STILL ANOTHER OBJECT of the present invention is to provide a device for grabbing eels and other creatures that is simple to use.

BRIEFLY STATED, STILL YET ANOTHER OBJECT of the present invention is to provide a locking device that is held in a hand of a user, grabs an eel directly at any desired position along the eel, impales the eel and locks onto the eel of any diameter both for secure grabbing. The locking device includes a stationary handle, a movable handle, a stationary jaw, and a movable jaw. The stationary handle and the movable handle are pivotally attached to each other, and are held in the hand of the user. The stationary jaw and the movable jaw are pivotally attached to each other, extend from the stationary handle and the movable handle, respectively, grab the eel directly at any desired position along the eel, and impale the eel and lock onto the eel of any diameter both for secure grabbing.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 3 is a side elevational view of the eel grabbing device per se;

FIG. 4 is a side elevational view thereof taken in the direction of arrow 4 in FIG. 3;

FIG. 5 is a top plan view thereof taken in the direction of arrow 5 in FIG. 3;

FIG. 6 is a side elevational view thereof taken in the direction of arrow 6 in FIG. 3;

FIG. 7 is a bottom plan view thereof taken in the direction of arrow 7 in FIG. 3;

FIG. 11 is a front plan view of a holder for clipping the device to a user's belt or pants; and FIG. 12 is a side elevational view thereof, taken in the direction of arrow 12 in FIG. 11.

Figure 1:
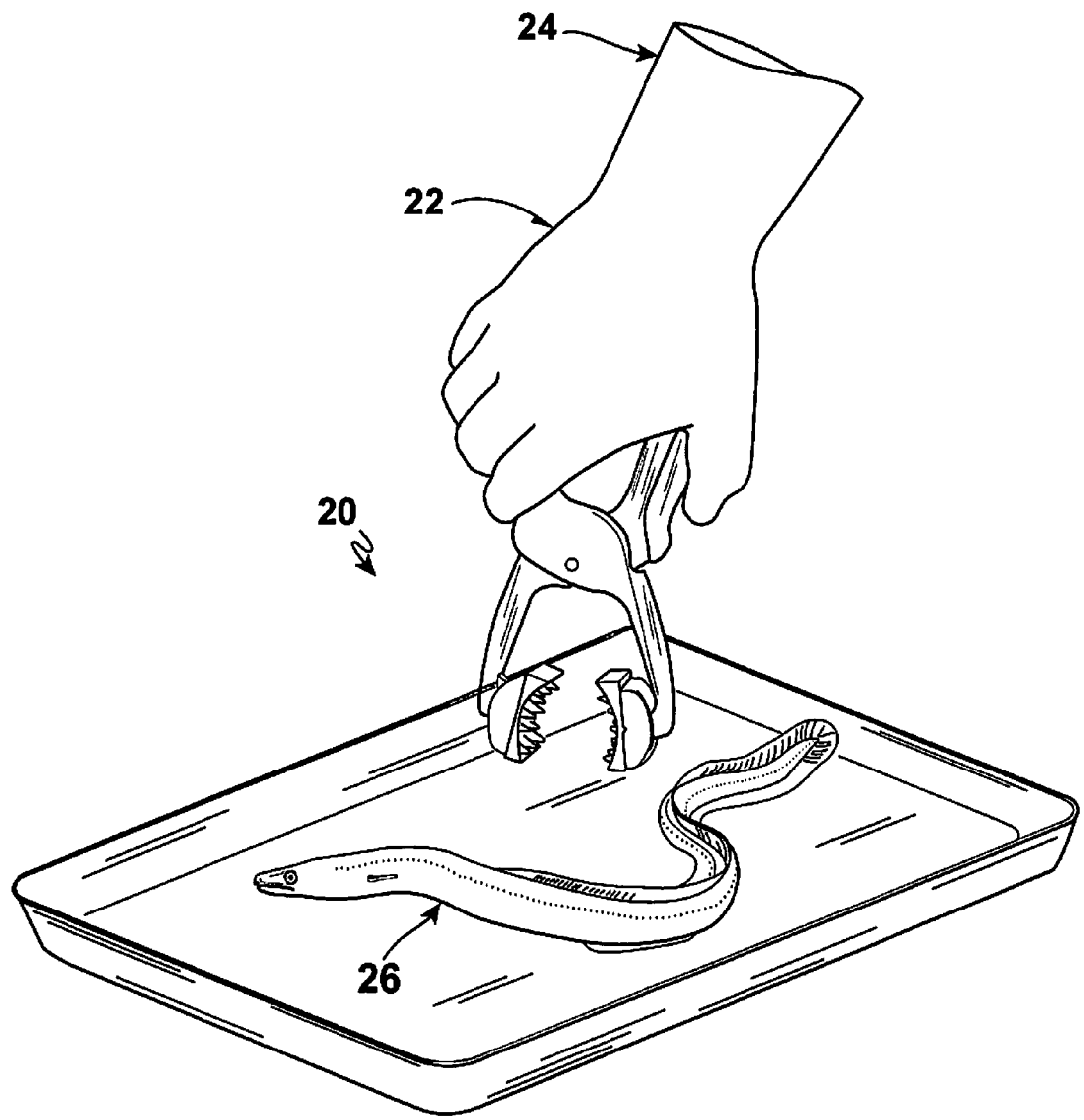
FIG. 1 is a diagrammatic perspective view showing an embodiment of the eel grabbing device in use.

A MARSHALING OF REFERENCE NUMERALS UTILIZED IN THE DRAWING 20 locking device of embodiments of present invention for being held in hand 22 of user 24, for grabbing eel 26 directly at any desired position along eel 26, for impaling eel 26 and for locking onto eel 26 of any diameter both for secure grabbing, and for being attachable to belt 28 of user 24

22 hand of user 24

24 user 26 eel 28 belt of user 24

30 stationary handle for being held in hand 22 of user 24

32 movable handle for being held in hand 22 of user 24

34 stationary jaw for grabbing eel 26 directly at any desired position along eel 26 and for impaling eel 26 and for locking onto eel 26 of any diameter both for secure grabbing 36 movable jaw for grabbing eel 26 directly at any desired position along eel 26 and for impaling eel 26 and for locking onto eel 26 of any diameter both for secure grabbing 38 carrier for allowing locking device 20 to be carried on belt 28 of user 24

40 first pivot point 42 stationary element 44 second pivot point 46 movable element 48 first pivot pin
50 ratchet assembly
52 ratchet release assembly
54 sector gear of ratchet assembly 50
56 spring of ratchet assembly 50
58 thumb lever of ratchet release assembly 52
60 pawl of ratchet release assembly 52
62 second pivot pin of ratchet release assembly 52
64 third pivot pin of ratchet release assembly 52
66 working terminal end of stationary jaw 34
68 working terminal end of movable jaw 36
70 stationary tonged tip of working terminal end 66 of stationary jaw 34
72 movable tonged tip of working terminal end 68 of movable jaw 36
74 stationary block of stationary tonged tip 70 of working terminal end 66 of stationary jaw 34
76 movable block of movable tonged tip 72 of working terminal end 68 of movable jaw 36
78 stationary flat surface of stationary block 74 of stationary tonged tip 70 of working terminal end 66 of stationary jaw 34
80 movable flat surface of movable block 76 of movable tonged tip 72 of working terminal end 68 of movable jaw 36
82 stationary impaler of stationary tonged tip 70 of working terminal end 66 of stationary jaw 34
84 movable impaler of movable tonged tip 72 of working terminal end 68 of movable jaw 36
86 stationary spikes of stationary impaler 82 of stationary tonged tip 70 of working terminal end 66 of stationary jaw 34
88 movable spikes of movable impaler 84 of movable tonged tip 72 of working terminal end 68 of movable jaw 36
90 tool-engaging portion of carrier 38
92 belt-engaging portion of carrier 38 for releasably engaging belt 28 of user 24
94 ball of tool-engaging portion 90 of carrier 38
96 looped lanyard of tool-engaging portion 90 of carrier 38
98 tubular member of belt-engaging portion 92 of carrier 38
100 tongue of belt-engaging portion 92 of carrier 38
102 large open top of tubular member 98 of belt-engaging portion 92 of carrier 38
104 narrow open bottom of tubular member 98 of belt-engaging portion 92 of carrier 38
106 longitudinal slot of tubular member 98 of belt-engaging portion 92 of carrier 38
108 space of belt-engaging portion 92 of carrier 38 for receiving belt 28 of user 24

DETAILED DESCRIPTION OF THE PREFERRED EMBODIMENT

Figure 2:
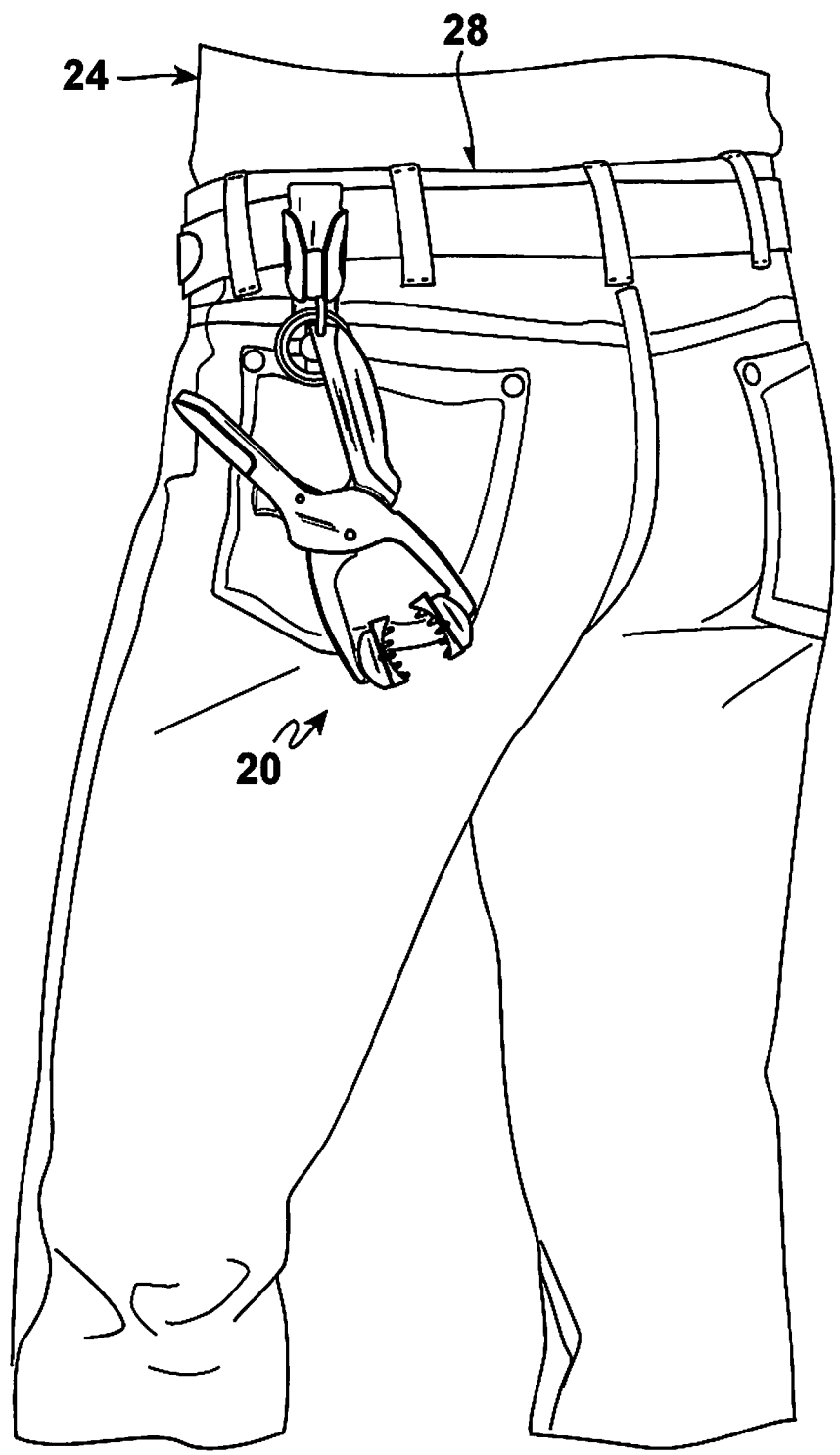
FIG. 2 is a is a diagrammatic perspective view illustrating the eel grabbing device stored ready for instant use from a user's pants belt.
Figure 8:
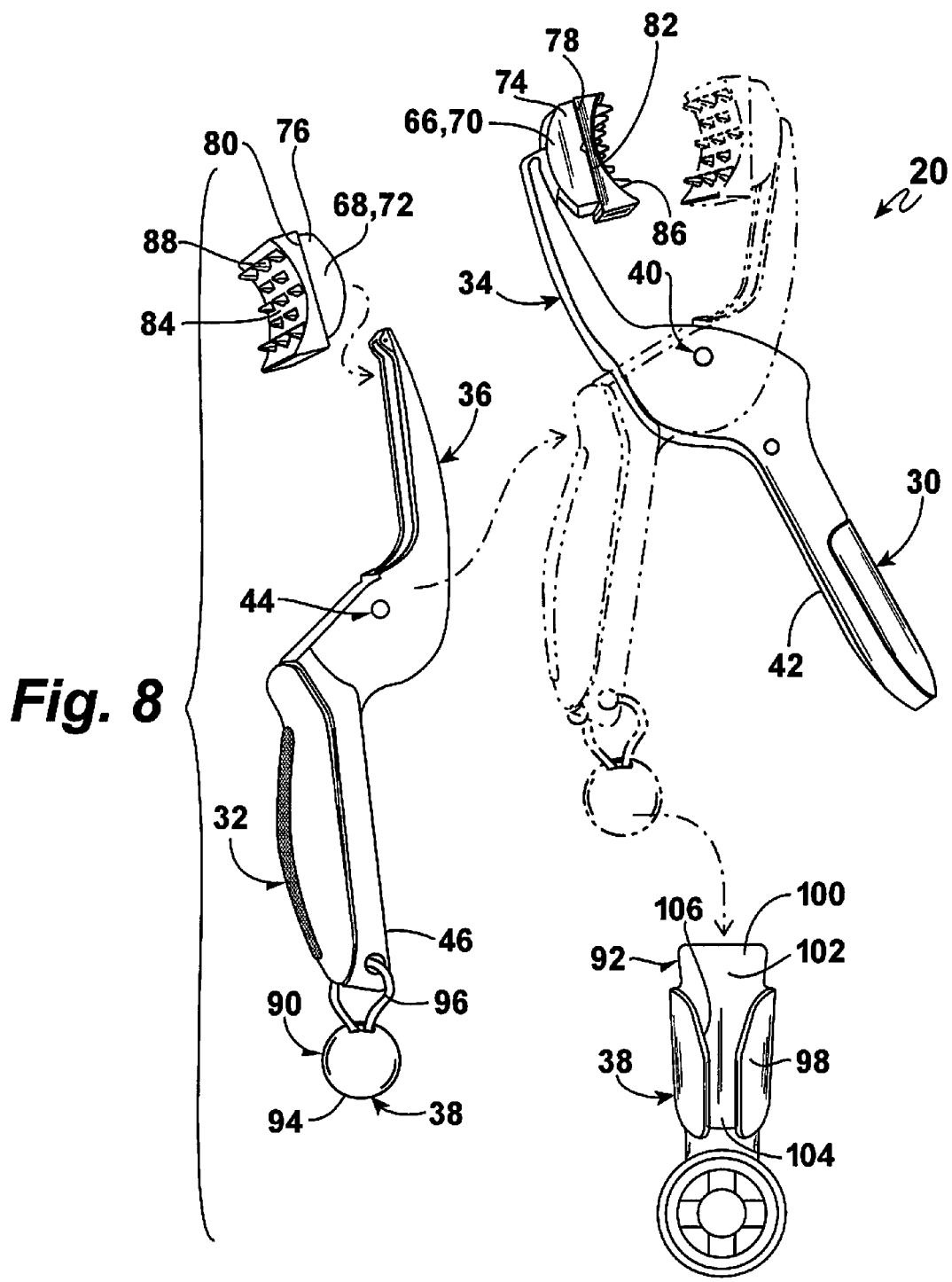
FIG. 8 is an exploded diagrammatic assembly view showing the relationship between the two plier components of the invention.
Figures 9, 10:
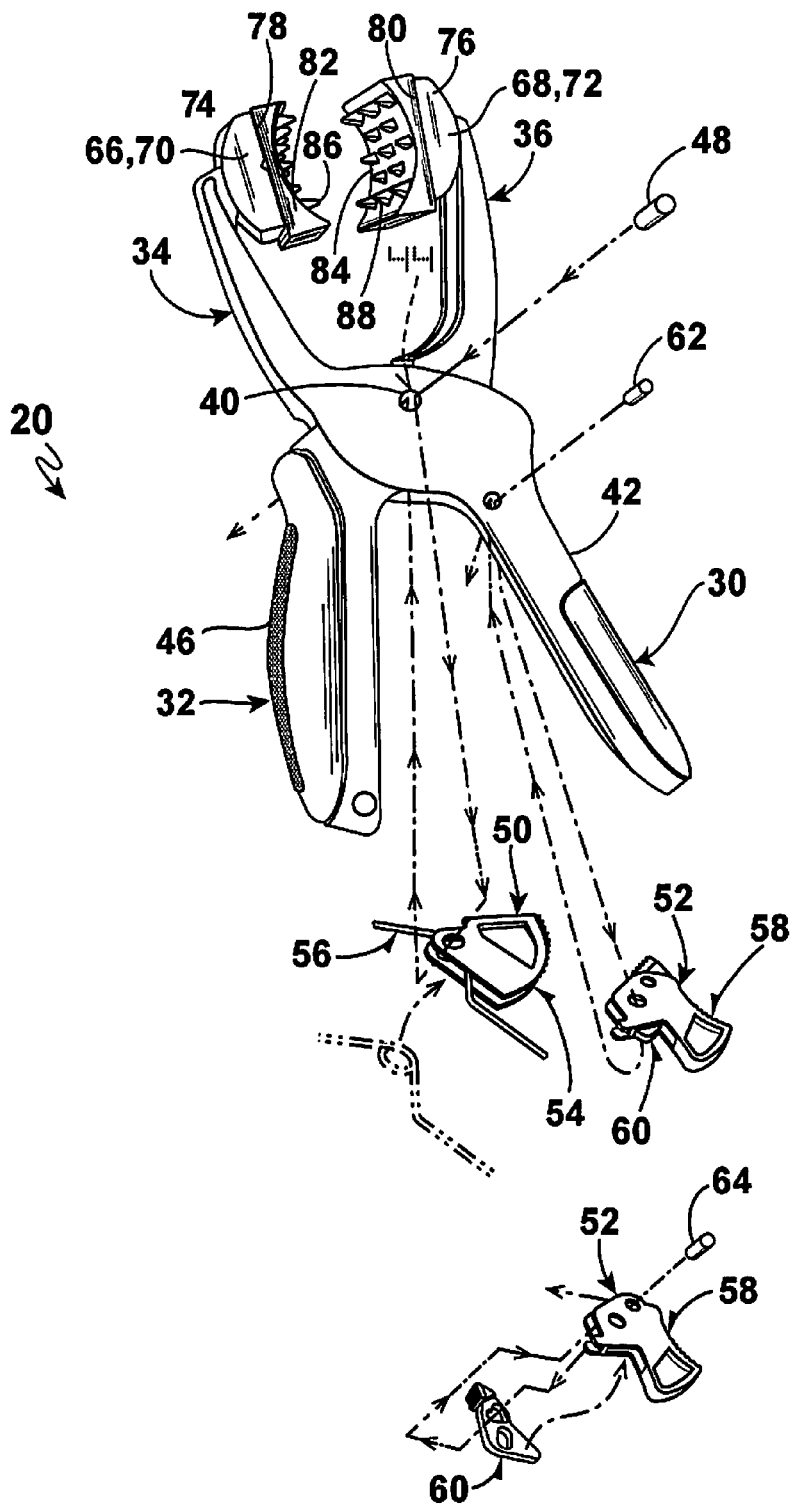
FIG. 9 is an exploded diagrammatic assembly view showing the relationship of other components to each other and their placement into the pliers assembly of the invention.
FIG. 10 is an exploded diagrammatic assembly view showing the relationship a sub assembly of components which are located in the pliers assembly of the invention.

Referring now to the figures, in which like numerals indicate like parts, and particularly to FIGS. 1 and 2, the locking device of the embodiments of the present invention is shown generally at 20 for being held in a hand 22 of a user 24, for grabbing an eel 26 directly at any desired position along the eel 26, for impaling the eel 26 and for locking onto the eel 26 of any diameter both for secure grabbing, and for being attachable to a belt 28 of the user 24 (FIG. 2).

The configuration of the locking device 20 can best be seen in FIGS. 3-10, and as such, will be discussed with reference thereto.

The locking device 20 comprises a stationary handle 30, a movable handle 32, a stationary jaw 34, and a movable jaw 36. The stationary handle 30 and the movable handle 32 are pivotally attached to each other, and are for being held in the hand 22 of the user 24. The stationary jaw 34 and the movable jaw 36 are pivotally attached to each other, extend from the stationary handle 30 and the movable handle 32, respectively, and are for grabbing the eel 26 directly at any desired position along the eel 26 and for impaling the eel 26 and for locking onto the eel 26 of any diameter both for secure grabbing.

The locking device 20 further comprises a carrier 38.

The carrier 38 is releasably attached to the movable handle 32, and is for allowing the locking device 20 to be carried on the belt 28 of the user 24.

The stationary jaw 34 is serpentinely attached to the stationary handle 30 at a first pivot point 40 so as to form a stationary element 42, while the movable jaw 36 is serpentinely attached to the movable handle 32 at a second pivot point 44 so as to form a movable element 46.

The first pivot point 40 is in alignment with the second pivot point 44, and pivotally receive a first pivot pin 48 so as to allow the movable element 46 to be pivotally attached to the stationary element 42.

The locking device 20 further comprises a ratchet assembly 50.

The ratchet assembly 50 is operatively attached to where the stationary element 42 and the movable element 46 are pivotally attached to each other.

The locking device 20 further comprises a ratchet release assembly 52.

The ratchet release assembly 52 is pivotally attached to the stationary handle 30, and is operatively connected to the ratchet assembly 50.

The ratchet assembly 50 comprises a sector gear 54 and a spring 56.

The spring 56 of the ratchet assembly 50 is operatively connected to the sector gear 54 of the ratchet assembly 50, with the spring 56 of the ratchet assembly 50 and the sector gear 54 of the ratchet assembly 50 pivotally receiving the first pivot pin 48.

The ratchet assembly 50 operates to maintain the stationary jaw 34 and the movable jaw 36 in position for grabbing the eel 26 directly at any desired position along the eel 26 and for impaling the eel 26 and for locking onto the eel 26 of any diameter both for secure grabbing.

The ratchet release assembly 52 comprises a thumb lever 58 and a pawl 60.

The thumb lever 58 of the ratchet release assembly 52 is pivotally attached in the stationary handle 30 by a second pivot pin 62, and is operatively connected to the spring 56 of the ratchet assembly 50.

The pawl 60 of the ratchet release assembly 52 is pivotally attached in the thumb lever 58 of the ratchet release assembly 52 by a third pivot pin 64, and is operatively connected to the sector gear 54 of the ratchet assembly 50.

The stationary jaw 34 has a working terminal end 66, while the movable jaw 36 has a working terminal end 68.

The working terminal end 66 of the stationary jaw 34 is formed into a stationary tonged tip 70, while the working terminal end 68 of the movable jaw 36 is formed into a movable tonged tip 72.

The stationary tonged tip 70 of the working terminal end 66 of the stationary jaw 34 opposes the movable tonged tip 72 of the working terminal end 68 of the movable jaw 36.

The stationary tonged tip 70 of the working terminal end 66 of the stationary jaw 34 comprises a stationary block 74, while the movable tonged tip 72 of the working terminal end 68 of the movable jaw 36 comprises a movable block 76.

The stationary block 74 of the stationary tonged tip 70 of the working terminal end 66 of the stationary jaw 34 opposes the movable block 76 of the movable tonged tip 72 of the working terminal end 68 of the movable jaw 36.

The stationary block 74 of the stationary tonged tip 70 of the working terminal end 66 of the stationary jaw 34 is generally semi-cylindrical-shaped and partially defined by a stationary flat surface 78, while the movable block 76 of the movable tonged tip 72 of the working terminal end 68 of the movable jaw 36 is generally semi-cylindrical-shaped and partially defined by a movable flat surface 80.

The stationary flat surface 78 of the stationary block 74 of the stationary tonged tip 70 of the working terminal end 66 of the stationary jaw 34 opposes the movable flat surface 80 of the movable block 76 of the movable tonged tip 72 of the working terminal end 68 of the movable jaw 36.

The stationary tonged tip 70 of the working terminal end 66 of the stationary jaw 34 further comprises a stationary impaler 82, while the movable tonged tip 72 of the working terminal end 68 of the movable jaw 36 further comprises a movable impaler 84.

The stationary impaler 82 of the stationary tonged tip 70 of the working terminal end 66 of the stationary jaw 34 opposes the movable impaler 84 of the movable tonged tip 72 of the working terminal end 68 of the movable jaw 36.

The stationary impaler 82 of the stationary tonged tip 70 of the working terminal end 66 of the stationary jaw 34 extends inwardly from the stationary flat surface 78 of the stationary block 74 of the stationary tonged tip 70 of the working terminal end 66 of the stationary jaw 34 and terminates in stationary spikes 86 for impaling the eel 26, while the movable impaler 84 of the movable tonged tip 72 of the working terminal end 68 of the movable jaw 36 extends inwardly from the movable flat surface 80 of the movable block 76 of the movable tonged tip 72 of the working terminal end 68 of the movable jaw 36 and terminates in movable spikes 88 for impaling the eel 26.

The specific configuration of the carrier 38 can best be seen in FIGS. 3-8, 11, and 12, and as such, will be discussed with reference thereto.

The carrier 38 comprises a tool-engaging portion 90 and a belt-engaging portion 92.

The tool-engaging portion 90 of the carrier 38 is pivotally affixed through the movable handle 32, while the belt-engaging portion 92 of the carrier is for releasably engaging the belt 28 of the user 24.

The tool-engaging portion 90 of the carrier 38 comprises a ball 94 and a looped lanyard 96.

The looped lanyard 96 of the tool-engaging portion 90 of the carrier 38 passes freely through the movable handle 32 and freely through the ball 94 of the tool-engaging portion 90 of the carrier 38 so as to allow the ball 94 of the tool-engaging portion 90 of the carrier 38 to hang freely from the movable handle 32.

The belt-engaging portion 92 of the carrier 38 comprises a tubular member 98 and a tongue 100.

The tubular member 98 of the belt-engaging portion 92 of the carrier 38 is vertically oriented, downwardly tapering so as to have a large open top 102 and a narrow open bottom 104, and further has a longitudinal slot 106.

The longitudinal slot 106 of the tubular member 98 of the belt-engaging portion 92 of the carrier 38 extends from, and opens into, the large open top 102 of the tubular member 98 of the belt-engaging portion 92 of the carrier to 38, and opens into, the narrow open bottom 104 of the tubular member 98 of the belt-engaging portion 92 of the carrier 38 so as to give the tubular member 98 of the belt-engaging portion 92 of the carrier 38 a bit of resiliency.

The tongue 100 of the belt-engaging portion 92 of the carrier 38 extends downwardly from the large open top 102 of, and forms a space 108 relative to, the tubular member 98 of the belt-engaging portion 92 of the carrier 38, with the space 108 of the belt-engaging portion 92 of the carrier 38 being for receiving the belt 28 of the user 24, and with the ball 94 of the tool-engaging portion 90 of the carrier 38 entering into the large open top 102 of the tubular member 98 of the belt-engaging portion 92 of the carrier 38, sliding down the tubular member 98 of the belt-engaging portion 92 of the carrier 38 and the looped lanyard 96 of the tool-engaging portion 90 of the carrier 38 sliding down the longitudinal slot 102 of the tubular member 98 of the belt-engaging portion 92 of the carrier 38, until the ball 94 of the tool-engaging portion 90 of the carrier 38 is captured by the narrow open bottom 104 of the tubular member 98 of the belt-engaging portion 92 of the carrier 38 for thereby allowing the locking device 20 to replaceably hang from the belt 28 of the user 24.

It will be understood that each of the elements described above, or two or more together, may also find a useful application in other types of constructions differing from the types described above.

While the invention has been illustrated and described as embodiments of a device for grabbing eels and other creatures, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A locking device for being held in a hand of a user, for grabbing an eel directly at any desired position along the eel, for impaling the eel and for locking onto the eel of any diameter both for secure grabbing, and for being replaceable attachable to a belt of the user, said locking device comprising:
   a) a stationary handle;
   b) a movable handle;
   c) a stationary jaw; and
   d) a movable jaw;
   wherein said stationary handle and said movable handle are pivotally attached to each other;
   wherein said stationary handle and said movable handle are for being held in the hand of the user;
   wherein said stationary jaw and said movable jaw are pivotally attached to each other;
   wherein said stationary jaw and said movable jaw extend from said stationary handle and said movable handle, respectively;
   wherein said stationary jaw and said movable jaw are for grabbing the eel directly at any desired position along the eel;
   wherein said stationary jaw and said movable jaw and for impaling the eel and for locking onto the eel of any diameter both for secure grabbing;
   wherein said stationary jaw has a working terminal end;
   wherein said movable jaw has a working terminal end;

wherein said working terminal end of said stationary jaw is formed into a stationary tonged tip;
wherein said working terminal end of said movable jaw is formed into a movable tonged tip;
wherein said stationary tonged tip of said working terminal end of said stationary jaw comprises a stationary block;
wherein said movable tonged tip of said working terminal end of said movable jaw comprises a movable block;
wherein said stationary block of said stationary tonged tip of said working terminal end of said stationary jaw is generally semi-cylindrical-shaped and partially defined by a stationary flat surface;
wherein said movable block of said movable tonged tip of said working terminal end of said movable jaw is generally semi-cylindrical-shaped and partially defined by a movable flat surface;
wherein said stationary tonged tip of said working terminal end of said stationary jaw comprises a stationary impaler;
wherein said movable tonged tip of said working terminal end of said movable jaw comprises a movable impaler;
wherein said stationary impaler of said stationary tonged tip of said working terminal end of said stationary jaw extends inwardly from said stationary flat surface of said stationary block of said stationary tonged tip of said working terminal end of said stationary jaw to a semicircular and concave shaped surface; and
wherein said movable impaler of said movable tonged tip of said working terminal end of said movable jaw extends inwardly from said movable flat surface of said movable block of said movable tonged tip of said working terminal end of said movable jaw to a semicircular and concave shaped surface.

2. The locking device of claim 1, further comprising a carrier; and
wherein said carrier is for allowing said locking device to be carried on the belt of the user.

3. The locking device of claim 2, wherein said carrier is realizable attached to said movable handle.

4. The locking device of claim 1, wherein said stationary jaw is serpentinely attached to said stationary handle at a first pivot point so as to form a stationary element.

5. The locking device of claim 4, wherein said movable jaw is serpentinely attached to said movable handle at a second pivot point so as to form a movable element.

6. The locking device of claim 5, wherein said first pivot point is in alignment with said second pivot point.

7. The locking device of claim 5, wherein said first pivot point and said second pivot point pivotally receive a first pivot pin so as to allow said movable element to be pivotally attached to said stationary element.

8. The locking device of claim 5, further comprising a ratchet assembly.

9. The locking device of claim 8, wherein said ratchet assembly is operatively attached to where said stationary element and said movable element are pivotally attached to each other.

10. The locking device of claim 8, further comprising a ratchet release assembly.

11. The locking device of claim 10, wherein said ratchet release assembly is pivotally attached to said stationary handle.

12. The locking device of claim 10, wherein said ratchet release assembly is operatively connected to said ratchet assembly.

13. The locking device of claim 10, wherein said ratchet release assembly is pivotally attached to said stationary handle.

14. The locking device of claim 10, wherein said ratchet release assembly is operatively connected to said ratchet assembly.

15. The locking device of claim 10, wherein said ratchet assembly comprises a sector gear.

16. The locking device of claim 15, wherein said ratchet assembly comprises a spring.

17. The locking device of claim 16, wherein said spring of said ratchet assembly is operatively connected to said sector gear of said ratchet assembly.

18. The locking device of claim 16, wherein said spring of said ratchet assembly and said sector gear of said ratchet assembly pivotally receive said first pivot pin.

19. The locking device of claim 8, wherein said ratchet assembly operates to maintain said stationary jaw and said movable jaw in position for grabbing the eel directly at any desired position along the eel and for impaling the eel and for locking onto the eel of any diameter both for secure grabbing.

20. The locking device of claim 16, wherein said ratchet release assembly comprises a thumb lever.

21. The locking device of claim 20, wherein said ratchet release assembly comprises a pawl.

22. The locking device of claim 20, wherein said thumb lever of said ratchet release assembly is pivotally attached in said stationary handle by a second pivot pin.

23. The locking device of claim 20, wherein said thumb lever of said ratchet release assembly is operatively connected to said spring of said ratchet assembly.

24. The locking device of claim 21, wherein said pawl of said ratchet release assembly is pivotally attached in said thumb lever of said ratchet release assembly by a third pivot pin.

25. The locking device of claim 21, wherein said pawl of said ratchet release assembly is operatively connected to said sector gear of said ratchet assembly.

26. The locking device of claim 1, wherein said stationary tonged tip of said working terminal end of said stationary jaw opposes said movable tonged tip of said working terminal end of said movable jaw.

27. The locking device of claim 1, wherein said stationary block of said stationary tonged tip of said working terminal end of said stationary jaw opposes said movable block of said movable tonged tip of said working terminal end of said movable jaw.

28. The locking device of claim 1, wherein said stationary flat surface of said stationary block of said stationary tonged tip of said working terminal end of said stationary jaw opposes said movable flat surface of said movable block of said movable tonged tip of said working terminal end of said movable jaw.

29. The locking device of claim 1, wherein said stationary impaler of said stationary tonged tip of said working terminal end of said stationary jaw opposes said movable impaler of said movable tonged tip of said working terminal end of said movable jaw.

30. The locking device of claim 1, wherein said semicircular and concave surface of said stationary impaler of said stationary tonged tip of said working terminal end of said stationary jaw has stationary spikes terminating therefrom; and
wherein said stationary spikes of said stationary impaler of said stationary tonged tip of said working terminal end of said stationary jaw are for impaling the eel.

31. The locking device of claim 1, wherein said semicircular and concave surface of said movable impaler of said movable tonged tip of said working terminal end of said movable jaw movable spikes terminating therefrom; and wherein said movable spikes of the movable impaler of said movable tonged tip of said working terminal end of said movable jaw are for impaling the eel.

32. The locking device of claim 2, wherein said carrier comprises a tool-engaging portion.

33. The locking device of claim 32, wherein said carrier comprises a belt-engaging portion; and wherein said belt-engaging portion of said carrier is for realizable engaging the belt of the user.

34. The locking device of claim 32, wherein said tool-engaging portion of said carrier is pivotally affixed through said movable handle.

35. The locking device of claim 33, wherein said tool-engaging portion of said carrier comprises a ball.

36. The locking device of claim 35, wherein said tool-engaging portion of said carrier comprises a looped lanyard.

37. The locking device of claim 36, wherein said looped lanyard of said tool-engaging portion of said carrier passes freely through said movable handle and freely through said ball of said tool-engaging portion of said carrier so as to allow said ball of said tool-engaging portion of said carrier to hang freely from said movable handle.

38. The locking device of claim 36, wherein said belt-engaging portion of said carrier comprises a tubular member.

39. The locking device of claim 38, wherein said belt-engaging portion of said carrier comprises a tongue.

40. The locking device of claim 38, wherein said tubular member of said belt-engaging portion of said carrier is vertically oriented.

41. The locking device of claim 38, wherein said tubular member of said belt-engaging portion of said carrier is downwardly tapering.

42. The locking device of claim 39, wherein said tubular member of said belt-engaging portion of said carrier has a large open top.

43. The locking device of claim 42, wherein said tubular member of said belt-engaging portion of said carrier has a narrow open bottom.

44. The locking device of claim 43, wherein said tubular member of said belt-engaging portion of said carrier has a longitudinal slot.

45. The locking device of claim 44, wherein said longitudinal slot of said tubular member of said belt-engaging portion of said carrier extends from, and opens into, said large open top of said tubular member of said belt-engaging portion of said carrier to, and opens into, said narrow open bottom of said tubular member of said belt-engaging portion of said carrier so as to give said tubular member of said belt-engaging portion of said carrier a bit of resiliency.

46. The locking device of claim 42, wherein said tongue of said belt-engaging portion of said carrier extends downwardly from said large open top of said tubular member of said belt-engaging portion of said carrier.

47. The locking device of claim 42, wherein said tongue of said belt-engaging portion of said carrier extends downwardly from said large open top of, and forms a space relative to, said tubular member of said belt-engaging portion of said carrier; and wherein said space of said belt-engaging portion of said carrier is for receiving the belt of the user.

48. The locking device of claim 44, wherein said ball of said tool-engaging portion of said carrier enters into said large open top of said tubular member of said belt-engaging portion of said carrier, slides down said tubular member of said belt-engaging portion of said carrier with said looped lanyard of said tool-engaging portion of said carrier sliding down said longitudinal slot of said tubular member of said belt-engaging portion of said carrier until said ball of said tool-engaging portion of said carrier is captured by said narrow open bottom of said tubular member of said belt-engaging portion of said carrier for thereby allowing said locking device to replaceable hang from the belt of the user.

\* \* \* \* \*